July 27, 1954

E. A. ODIN 2,684,822

SUPPORTING STRUCTURE

Filed Oct. 2, 1948

Inventor.
Eugene A. Odin.
By Slice & Slice Attys.

Inventor
Eugene A. Odin
By Lee & Lee Attys.

Patented July 27, 1954

2,684,822

UNITED STATES PATENT OFFICE 2,684,822

SUPPORTING STRUCTURE

Eugene A. Odin, Chicago, Ill.

Application October 2, 1948, Serial No. 52,529

7 Claims. (Cl. 248—179)

The invention relates generally to supporting structures such as tripods and the like, and is particularly adapted for use in supporting cameras, screens, lights and other objects.

The invention is of particular use for example, as a camera tripod and has among its objects, the production of a structure in which the camera or other objects supported, may be readily manipulated or adjusted in any desired angle or position, and in which the supporting legs may be readily disposed at any desired position relative to the other legs.

Another object of the invention is the production of such a supporting structure which, although freely adjustable, possesses an inherent stability which will efficiently retain the supported object in any desired adjusted position.

Another object of the invention is the production of a tripod or like supporting structure which is relatively simple in construction, inexpensive to manufacture and very durable in use.

A further object of the invention is the production of a tripod structure having novel means for facilitating the adjustment of the supported object.

A further object of the invention is the production of a flexible element having suitable characteristics for incorporation in such a type of tripod structure.

Many other objects and advantages of the invention herein shown and described will be obvious to those skilled in the art from the disclosure herein given.

The present invention contemplates a structure, as for example a tripod, having a plurality of rigid legs, which if desired may be extensible, adapted to be secured to a camera or other object supporting head by means of flexible elements, whereby the legs may be positioned at different distances and different heights relative to the object supporting head, and in which the latter, regardless of the relative positions of the rigid legs may be readily adjusted on both horizontal and vertical axis, the head merely being rotated or moved to the desired position, which position will be retained without employing separate locking means or the like. Likewise, when so adjusted, the head is relatively rigid and stable so that a camera or the like may readily be supported thereby.

I am aware that there have been numerous structures for supporting lamps and the like, embodying flexible elements to provide more or less universal adjustment. These however, to my knowledge have all embodied single flexible elements as contrasted with the present invention, in which a plurality of flexible elements cooperate to provide a readily adjustable structure capable of providing adequate rigidity and stability in any of its adjusted positions.

Referring to the drawings, wherein like reference characters indicate like or corresponding parts:

Fig. 4 is a partial sectional view of one of the flexible elements employed.

As the invention is particularly suited for embodiment in a camera tripod, for the purposes of illustration, the invention will be described in connection with such a tripod structure. However, it will be apparent that the invention is applicable to other uses and applications.

Camera tripods in the past have generally been provided with a camera supporting head to which three rigid legs are pivotally connected on horizontal axes, whereby each leg may be moved toward and away from other legs, and usually the legs are made in sections, one of which is retractable relative to the other. As each leg is rotatable relative to the head in substantially a single plane, it will be apparent that it is oftentimes difficult to set up the tripod with the head in a desired position, particularly when it is to be set up on rough or uneven surfaces. To facilitate the camera adjustment, various expedients have been utilized, as for example, a ball and socket joint between the camera and tripod head, and while these have to some extent facilitated the adjustment of the camera, they have not appreciably facilitated the setting up of the tripod. In contrast to such types of structures, a tripod embodying the present invention may be readily set up on rough or uneven ground merely by engaging the rigid legs with the supporting surface at suitable points and then moving the camera supporting head in any direction to achieve the desired position.

Figure 1:
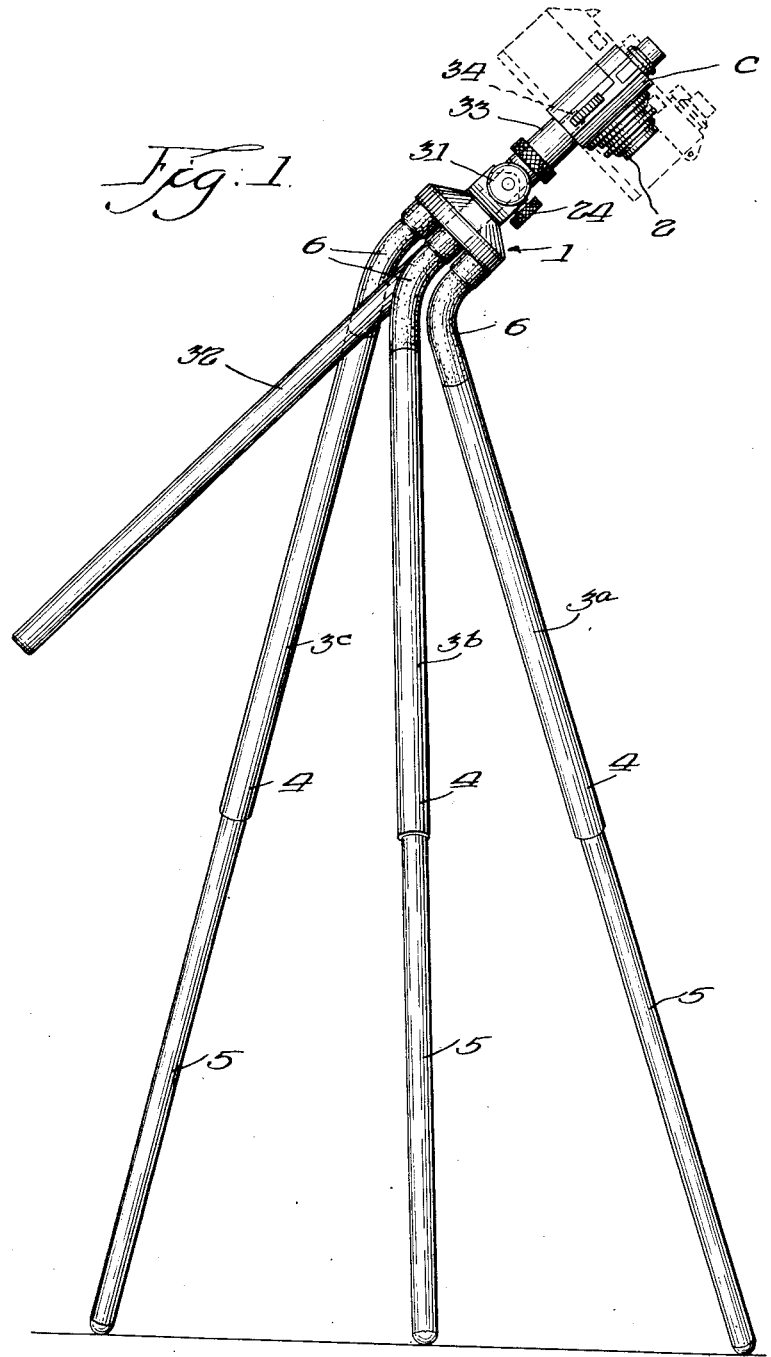
Fig. 1 is a side elevational view of a tripod embodying the present invention.
Figure 2:
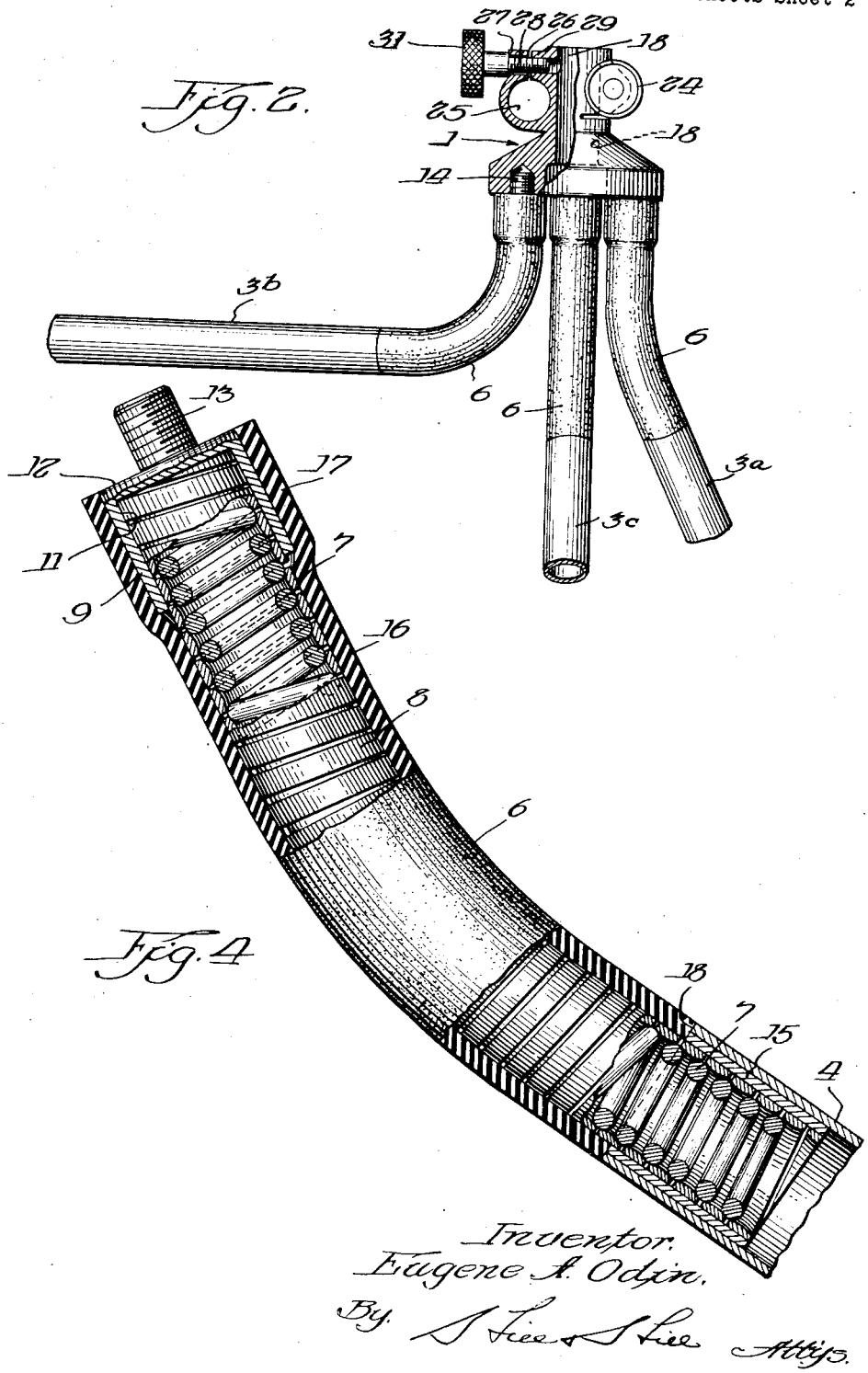
Fig. 2 is a side elevational view of a tripod head with parts thereof in section showing the details of construction thereof.

Referring to the drawings and particularly to Figs. 1 and 2, 1 indicates generally an object supporting head illustrated in the present instance as having a camera 2 operatively mounted thereon. The head 1 is supported by three legs 3a, 3b and 3c, each comprising a rigid upper section 4 formed from tubular material or the like, in which is retractably mounted cylindrical sections 5, the sections 5 each being rigidly locked in its desired position relative to its section 4 by any suitable means, the details of which form no part of the present invention.

Each of the legs 3a, 3b and 3c are operately connected at their upper ends to the head 1 by a flexible leg member 6. As illustrated in Fig. 4, each member 6 comprises a helical spring member 7 constructed of spring steel stock which is circular in cross section, over which is wound a secondary winding 8 of soft iron wire which is more or less oval in cross section. As illustrated, the upper end of each element 6 is mounted in a hollow cap member 9, having a bore 11 therein of a size to receive the end of the spring 7 and of secondary winding 8, the cap being securely held on the end of the flexible elements by a press fit or other suitable means. Extending outwardly from the end 12 of the cap member is a threaded stud 13 adapted to be threaded into a bore 14 in the head 1 as clearly illustrated in Fig. 2.

The opposite ends of spring 7 and winding 8 of each leg element is inserted and retained in a sleeve 15, this likewise being accomplished by a press fit or other suitable means. In the construction illustrated, the sleeve 15 is secured to the tubular section 4 of its corresponding rigid leg by a press fit, however screw threads or other suitable means may be employed if desired. Each spring 7 and winding 8 is enclosed in a resilient tubular cover member 16 of rubber or the like, the upper end 17 of which may extend over the cylindrical surface of the cap 9, and the lower end 18 of the member 16 may butt against the adjacent end edges of the leg section 4 and sleeve 15, with the external diameter of the covering 16 being substantially equal to the diameter of the leg section 4 to provide a smooth unbroken appearance.

Figure 3:
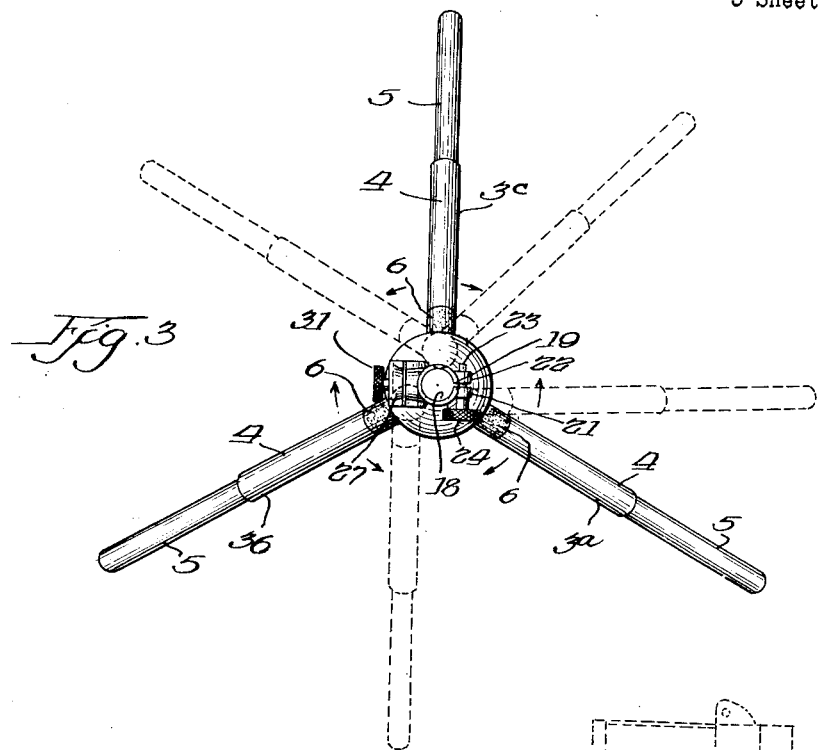
Fig. 3 is a top plan view of a tripod embodying the present invention.

As illustrated in Figs. 2, 3 and 4, the head 1 is formed with a bore 18' therein, the latter extending vertically as viewed in Fig. 2, the side-wall of the head forming the bore being split as indicated at 19, and provided with oppositely disposed lugs 21 and 22. Passing through the lug 21 and threaded into the lug 22 is a screw 23, having a head 24 positioned adjacent to and engageable with the lug 21, by means of which the lugs 21, 22 may be drawn together to rigidly lock a tubular member, inserted in the bore 18, to the head 1. The latter is also provided with a second bore 25, the axis of which lies in plane extending at right angles to the bore 18. The portion of the head 1 through which the bore 25 extends is also split as indicated at 26 and formed with a lug 27 through which extends a clamping screw 28 threaded into the portion 29 of the head, the screw 28 having a head 31 engageable with the lug 27, whereby the latter may be moved towards the portion 29 for clamping a tubular object in the bore 25.

In the construction illustrated in Fig. 1, positioned in the bore 18 and extending downwardly from the head 1 is a cylindrical extension member 32, which may be clamped to the head by tightening the screw 24. The extension 32 is provided at its upper end with a head 33 upon which may be mounted a camera c, the head 33 being provided with a threaded stud 34 or other suitable means for mounting the camera on the head 33, with the particular type of mounting means to be employed depending upon the construction of the camera.

Figure 5:
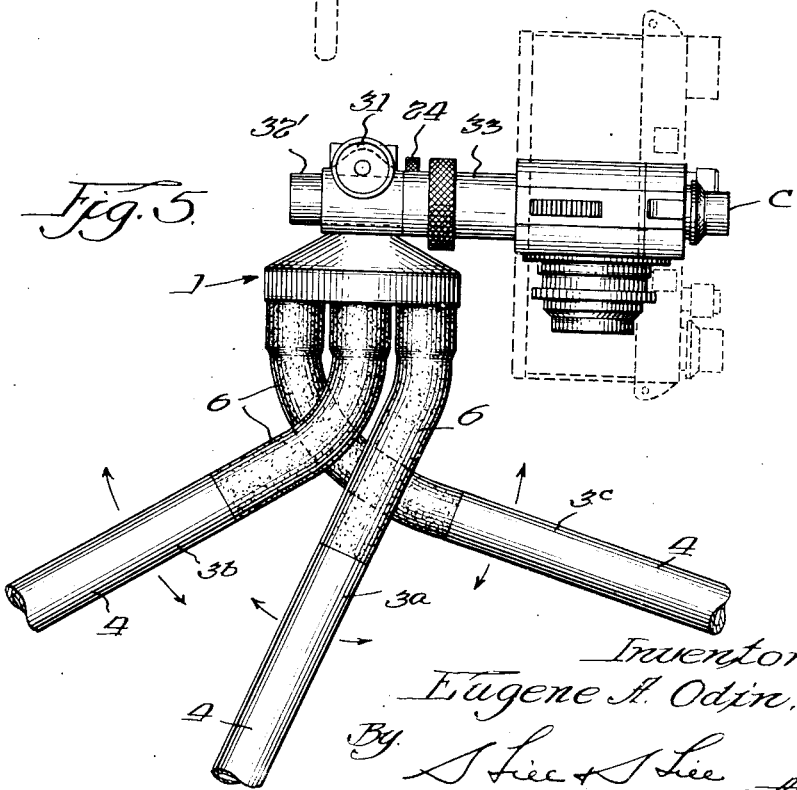
Fig. 5 is a side elevational view of the upper portion of a tripod embodying the present invention with a camera mounted thereon.

In use, the camera is attached to the head 33 of the member 32 and the sections 5 of the rigid legs locked in the desired relative positions, after which the tripod is placed on the ground or other supporting surface with the legs conveniently positioned. The head 1 may then be moved or rotated to move the camera and its lens into any desired position, this being readily accomplished by grasping the member 32 and swinging the same upwardly, downwardly or to the right or left as desired, with the flexible leg portions 6 readily flexing to permit the head to move to the desired position. If for any reason it is desired to rotate the camera on the axis of the member 32 while retaining the head 1 in a predetermined position, this may be readily accomplished by loosening the screw 24 and rotating the member 32 in the bore 18, as indicated in dotted lines in Fig. 1. Likewise, by raising the member 32 in the bore 18 and clamping the same in such position, an extension is provided whereby the camera or other object may be additionally elevated.

Where it is desired to mount the camera in a vertical position or rotatable about a more or less horizontal axis, the member 32 may be withdrawn from the bore 18 and inserted in the bore 25, or if desired a short member 32', illustrated in Fig. 5, may be substituted for the member 32, the member 32' being substantially identical with the member 32 and provided with a corresponding head 33 with the only difference between the two members being that the member 32' is considerably shorter than the member 32. Thus the camera c illustrated in Fig. 5 may be rotated about the axis of the member 32' as indicated in dotted lines.

Referring to Figs. 2, 3 and 5, it will be noted that the legs 3a, 3b and 3c may be moved relatively to one another in substantially all directions as indicated in Figs. 3 and 5 by the arrows and shown in dotted lines in Fig. 3. As illustrated in Fig. 2, any of the legs may be moved into a position, such as that shown for the leg 3c which is illustrated as being substantially in horizontal position. Similarly as illustrated in Fig. 5, the head 1 may be readily rotated about the axis of the bore 18, with the lower ends of the legs remaining in the same position on the supporting surface, the flexible leg members 6 merely twisting to the desired position.

Thus, when using the tripod in connection with a camera, the tripod may be merely set up, following which the user, sighting through the view finder of the camera, may merely turn or move the head 1 of the camera until the desired object to be photographed is in view.

The construction herein illustrated is very stable and the head 1 will retain any position of adjustment without tendency to shift or impart any motion to the camera, as the flexible leg members tend to equalize or counter-balance one another so that resultant forces tending to move the head in any one direction are reduced to a minimum. The resilient cover member 16 of each leg not only provides protection to the windings 7 and 8, preventing dirt, moisture, etc. from reaching the same, but also provides a snubbing or damping action on the wire elements, tending to counteract or retard the setting up of vibration, etc. in the structure, resulting in firm and steady but readily adjustable support for the camera or other object. While I have referred to the cover 16 as of rubber, the latter term is intended to cover natural or synthetic rubber, as well as other materials having suitable characteristics for the purposes intended.

It will be noted from the above description that I have provided a novel supporting structure which is relatively simple in construction, and which will efficiently support a camera or other object, the structure having an inherent stability even though the device is freely and readily adjustable.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a supporting device, the combination of a head member, said member having a pair of bores therein of like diameter one of which extends in a vertical direction and the other in a horizontal direction, clamping means for each of said bores associated with said member and operative to clamp an object thereon inserted in said bores to said members, a plurality of flexible leg members, each of which is provided at one end with a cap having a threaded stud extending outwardly therefrom and aligned with the axis of its leg member, said head member having a plurality of threaded bores therein having parallel axes in which are positioned respective studs, and a rigid leg for each of said leg members, each of said legs being secured at one end to the free end of a respective leg member, the latter forming flexible connections between said head member and the respective rigid legs, each of said flexible connections comprising a helical coil spring overlaid with a soft iron helical friction element, with the latter covered by a close fitting resilient tubular cover element, a tubular member positioned in said vertically extending bore and extending downwardly from said head between said legs and forming a handle by means of which said head may be moved, and means on the upper end of said member for supporting an object thereon.

2. In a tripod supporting device, the combination of a head member, said member having a bore therein, clamping means for said bore associated with said member and operative means for supporting and clamping an object thereon inserted in said bore to said member, a plurality of flexible leg members, each of which is provided at one end with a cap having a threaded stud extending outwardly therefrom and aligned with the axis of its leg member said head member having a plurality of threaded bores therein having parallel axes in which are positioned respective studs, and a rigid leg for each of said leg members, each of said legs being secured at one end to the free end of a respective leg member, the latter forming flexible connections between said head member and the respective rigid legs, each of said flexible connections comprising a helical coil spring overlaid with a soft iron helical friction element, with the latter covered by a close fitting resilient tubular cover element.

3. In a supporting device, the combination of a head member, said member having a bore therein, clamping means for said bore associated with said member and operative means for supporting and clamping an object, a plurality of flexible leg members, each of which is provided at one end with a cap having a threaded stud extending outwardly therefrom and aligned with the axis of its leg member, said head member having a plurality of threaded bores therein having parallel axes in which are positioned respective studs, and a rigid leg for each of said leg members, each of said legs being secured at one end to the free end of a respective leg member, the latter forming flexible connections between said head member and the respective rigid legs.

4. In a supporting device, the combination of a head member, said member having a pair of bores therein one of which extends in a vertical direction and the other in a horizontal direction, clamping means for each of said bores associated with said member and operative to clamp an object inserted in each respective bore to said member, a plurality of flexible leg members, each of which is secured at one end to said head member, a rigid leg for each of said leg members, each of said legs being secured at one end to the free end of a respective leg member, the latter forming flexible connections between said head member and the respective rigid legs, each of said flexible connections comprising a helical coil spring overlaid with a soft iron helical friction element, with the latter covered by a close fitting resilient tubular cover element, a downwardly extending member positioned in said vertically extending bore and extending downwardly from said head member between said legs and forming a handle by means of which said head member may be moved, and means on the upper end of said member for supporting an object thereon.

5. In a tripod structure the combination of a head member, three flexible and resilient leg members, each of which comprises a helical friction element and a resilient tubular element and is detachably secured at one end to said head member, and a rigid supporting leg for each of said leg members, each of said legs being secured at one end to the free end of a respective leg member, the latter forming flexible and resilient connections between said head member and the respective rigid legs, whereby the head member is adapted to be adjusted or manipulated in any desired angle or position and in which each of the supporting legs may be readily disposed at any desired position relative to the other legs and frictionally retained in its adjusted position.

6. In a supporting structure the combination of a head member, a plurality of flexible and resilient leg members, each of which comprises a soft iron helical friction element and resilient tubular element and is secured at one end to said head member, and an adjustable rigid leg for each of said leg members, each of said legs being secured at one end to the free end of a respective leg member, the latter forming flexible and resilient connections between said head member and the respective rigid legs whereby the head member is adapted to be adjusted or manipulated in any desired angle or position and in which each of the supporting legs may be readily disposed at any desired position relative to the other legs, each of said flexible and resilient connections comprising a helical coil spring overlaid with the soft iron helical friction element and resilient tubular element, whereby each of the connections is adapted to be frictionally retained in its adjusted position.

7. In a supporting structure the combination of a head member, a plurality of flexible and resilient leg members, each of which comprises a soft iron helical friction element and is secured at one end to said head member, and a rigid leg for each of said leg members, each of said legs being secured at one end to the free end of a respective leg member, the latter forming flexible and resilient connections between said head member and the respective rigid legs, each of said flexible and resilient connections comprising a helical coil spring overlaid with the soft iron helical friction element with the latter covered by a close fitting tensioned resilient tubular element, whereby the flexible and resilient connections are adapted to be frictionally retained in their adjusted positions.

References Cited in the file of this patent

UNITED STATES PATENTS

| Number | Name | Date |
|---|---|---|
| 567,531 | Arnold | Sept. 8, 1896 |
| 987,397 | Pittroff | Mar. 21, 1911 |
| 1,444,569 | Starkweather | Feb. 6, 1923 |
| 1,726,817 | Franklin | Sept. 3, 1929 |
| 2,111,368 | Kron | Mar. 15, 1938 |
| 2,166,258 | Matrat | July 18, 1939 |
| 2,558,763 | Lee | July 3, 1951 |

FOREIGN PATENTS

| Number | Country | Date |
|---|---|---|
| 528,438 | France | Nov. 12, 1921 |